United States Patent [19]

Bouchard

[11] 4,214,482
[45] Jul. 29, 1980

[54] INERTIAL INSTRUMENT

[75] Inventor: John R. Bouchard, Canton, Mass.

[73] Assignee: Northrop Corporation, Los Angeles, Calif.

[21] Appl. No.: 26,332

[22] Filed: Apr. 2, 1979

[51] Int. Cl.³ .................. G01C 19/08; G01C 19/34; G01C 19/42
[52] U.S. Cl. .................................. 73/504; 33/326; 74/5.4; 74/5.7; 364/447
[58] Field of Search .................. 33/326, 324; 73/504; 74/5.6 D, 5.7, 5.8, 5.4; 364/447, 457

[56] References Cited

U.S. PATENT DOCUMENTS

| 3,603,161 | 9/1971 | Schwarz | 74/5.7 |
|---|---|---|---|
| 3,611,815 | 10/1971 | Fischell | 74/5.7 |
| 3,664,199 | 5/1972 | Lahde | 74/5.6 D |
| 3,753,374 | 8/1973 | Strassburg | 74/5.7 |
| 3,858,328 | 1/1975 | La Rose | 33/317 D |
| 3,925,643 | 12/1975 | Roantree et al. | 364/447 |

Primary Examiner—James J. Gill
Attorney, Agent, or Firm—Kenway & Jenney

[57] ABSTRACT

Disclosed is apparatus and method for accurately determining the direction of true north or the change in drift of other gyroscopes. The apparatus comprises a single degree of freedom gyroscope driven by a permanent magnet electric motor. The gyroscope rotor is spun by the motor at varying speeds and the torque required to maintain the rotor at a null orientation is measured and recorded. The measured torques are processed to produce an accurate indication of true heading or to indicate the change in the level of drift of other gyroscopic instruments.

6 Claims, 2 Drawing Figures

INERTIAL INSTRUMENT

BACKGROUND OF THE INVENTION

This invention relates generally to gyroscope compasses and more particularly to a single degree of freedom gyrocompass driven by a permanent magnet motor and employing gyro rotor speed modulation techniques to determine the direction of true north.

The determination of true north using gyroscopes—gyrocompassing—is well known. In one method of gyrocompassing, a single degree of freedom gyroscope is arranged with its output axis aligned with the vertical and its input axis in the horizontal plane, pointing approximately in the east-west direction. The torque required to maintain the gyro rotor at a null orientation is measured and recorded. The gyroscope rotor is then rotated precisely 180° about the output axis and the torque again measured and recorded. In this way, the effects of inherent gyro drift are differentiated from earth rate effects, allowing heading to be determined.

Another method of gyrocompassing using a single degree of freedom gyro and rotor speed modulation techniques is also well known in the gyrocompassing art. A single degree of freedom gyro is mounted in a gimbal so that the gyro rotor, in addition to its freedom to spin about its spin axis, is free to rotate about a single axis perpendicular to the rotor spin axis. This axis is known as the output axis. For gyrocompassing with a single degree of freedom gyroscope, a torquing means, usually electromagnetic, applies torque about the output axis so as to maintain the rotor at a null angular orientation. That is, the applied torque is made equal in magnitude and opposite in direction to other torques occurring about the output axis. These other torques may be modeled as the sum of a torque due to the coupling of a component of the earth's angular velocity and nonspecific torques which lead to gyro drift. The nonspecific torques have myriad origins: electromagnetic disturbances, mechanical and dynamic imbalances and thermally caused distortions, to mention just a few.

Gyrocompassing with a single degree of freedom gyro using wheel speed modulation entails operating the gyro at a reference rotor speed and recording the torque required to maintain null rotor orientation. This measured torque is thus equal in magnitude to the disturbing torques, one component of which is that due to the earth's angular velocity. Importantly, that torque arising from the earth's rotation is directly proportional to the gyro rotor's angular momentum, and for a rotor with a constant moment of inertia, to the rotor's angular velocity. At a different rotor speed, therefore, the earth's rotation will cause a different disturbing torque. If it be assumed that the disturbing torques other than that due to earth rotation remain constant (or change in predictable ways) with changes in rotor speed then it is possible to determine the contribution of earth rotation to the total disturbing torques about the gyro output axis. From the magnitude of this earth rotation-induced disturbing torque can be calculated the direction of the earth's angular velocity vector, true north.

Gyrocompassing by means of rotor speed modulation has achieved but moderate accuracy in the past because of unpredictable changes in the disturbing torques (other than earth rotation induced) with rotor speed changes. A major source of this unpredictability has been the inconsistency in the magnetization level achieved within hysteresis motors, commonly used to drive gyro rotors. Each time the rotor is brought into synchronization at a different speed, a slightly magnetization of the hysteresis material occurs. This in turn causes different motor efficiencies and changes in the current level in the stator windings. The varying efficiencies cause changes in thermally generated torques and also changes in the motor magnetic field. This field interacts with other magnetic fields such as that of the earth and with conductive and permeable materials located near the torque summing member to produce disturbing torques about the gyro output axis which vary in unpredictable ways with rotor speed changes.

It is an object of the present invention, therefore, to provide an apparatus and method for determining true north very accurately using rotor speed modulation techniques.

SUMMARY OF THE INVENTION

The gyrocompass apparatus for indicating true north according to the present invention employs a permanent magnet electric motor to drive the gyroscope rotor about its spin axis at varying or two preselected speeds. The gyroscope rotor is supported within a gimbal which allows rotation not only about the rotor's spin axis, but also about an axis perpendicular to the spin axis. This axis is called the output axis of the gyroscope-gimbal assembly. A torquer, e.g., an electromagnetic torquer, for producing moments about the gyro output axis is regulated, as by a closed loop automatic feedback control system, to maintain the rotor at a null position about the output axis in the face of disturbing torques. Measuring means are provided for deriving a signal from the torquer which measures and indicates the magnitude of the torque being applied about the output axis. Because the rotor is being actively maintained at its null position, the magnitude of this applied torque equals the disturbing torques.

Since the use of stable permanent magnets in a permanent magnet motor eliminates variability of efficiency as motor speed changes, a gyrocompass using rotor speed modulation is capable of high accuracy. For example, one gyrocompass technique is to operate at two different rotor speeds. The signals measuring and indicating the torque levels applied about the output axis at the two rotor speeds are then processed to produce the torque contributed by the interaction of the gyro's angular momentum and the earth's rotation. This torque value is then further processed by signal processing and computing means to indicate the direction of true north.

In addition to gyrocompassing, the inertial instrument disclosed herein is well suited to monitoring the long term changes in drift of other gyroscopes, particularly those which control stable platforms. For this application, the platform rate, rather than earth rate is unknown and is sensed by the variable rotor speed monitoring gyroscope.

DESCRIPTION OF THE PREFERRED EMBODIMENT

Figure 1:
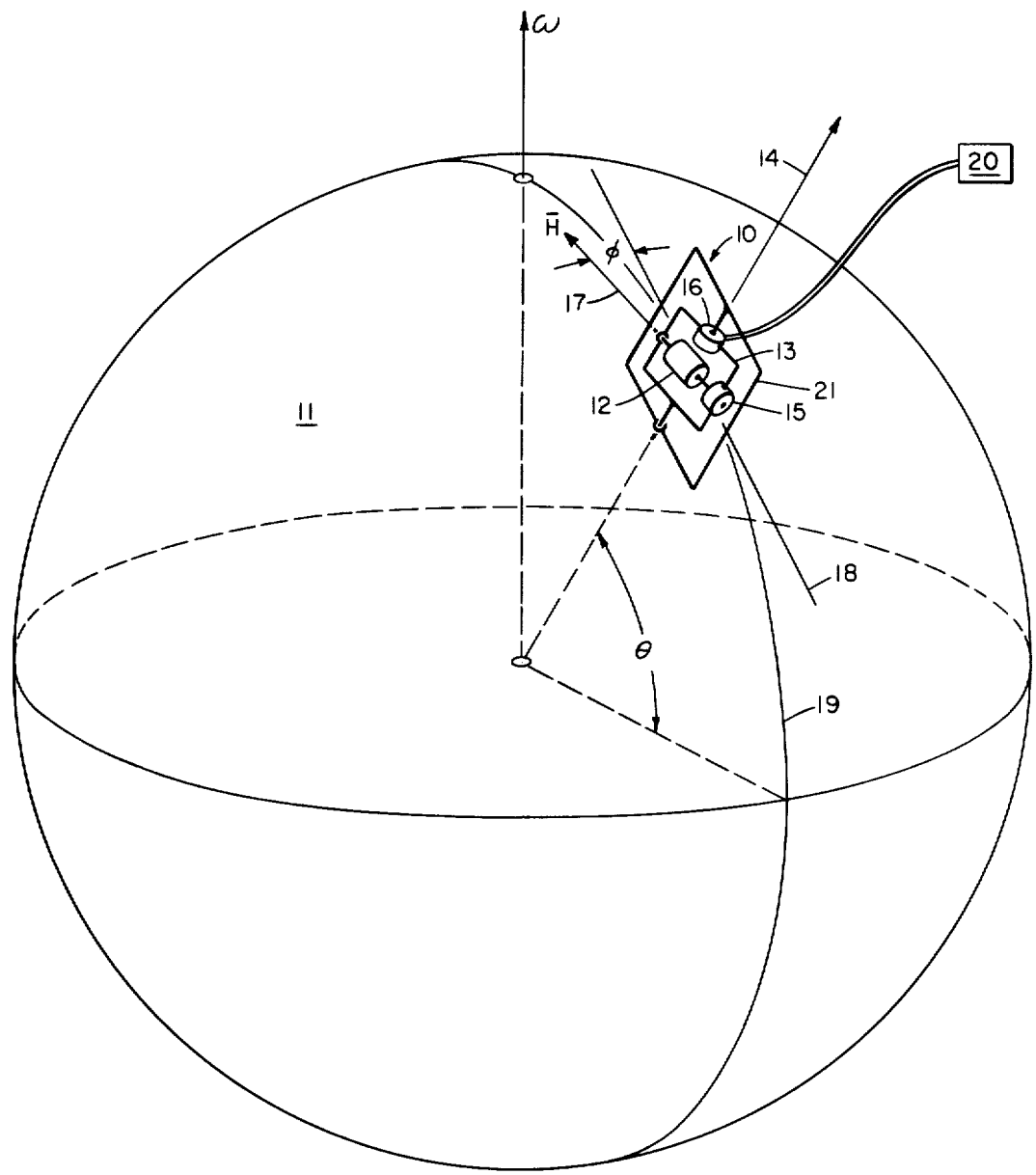
FIG. 1 is a diagrammatic representation of a preferred embodiment of the invention disclosed herein for gyrocompassing.

With reference to FIG. 1, a gyrocompass 10 is shown at the surface of the earth 11 at a latitude represented by the angle $\theta$. The rotor 12 of the gyrocompass 10 is supported within a gimbal 13 which allows the rotor 12 to rotate about a gimbal axis 14 within outer gimbal 21. The gimbal axis 14, the gyro output axis, is aligned with the vertical.

The rotor 12 is spun by a permanent magnet motor 15 which is of conventional design. The motor 15 is adapted to spin the rotor 12 at varying or two different preselected speeds. A torque motor 16 and its associated electronics (not shown) apply torque between the gimbal 13 and the outer gimbal 21 in such a way that the rotor 12 remains substantially at a null reference position in relation to the outer gimbal 21 in the face of disturbing torques. As shown illustratively in the drawing, when the rotor 12 is in the null position, the spin axis 17 of the rotor 12 forms a heading angle $\phi$ with the tangent line 18 which lies in the plane of the great circle 19 which passes through the gyrocompass location. The heading angle $\phi$ is the parameter to be measured by the gyrocompass 10.

In operation, the gyrocompass 10 is placed on the earth's surface with its output axis 14 aligned with the vertical. The spin axis 17 of the rotor 12 thus lies in the horizontal plane and points approximately in the north-south direction. The rotor 12 is then spun by the permanent magnet motor 15 to the first of two different preselected speeds, one, for example, maximum angular velocity and the other, one-half that value. The torque motor 16 maintains the rotor 12 at its null orientation with respect to the outer gimbal 21. The torque supplied by the torque motor 6 is measured and recorded by the signal processing and computing means represented at 20. Next, the rotor speed is changed to the other preselected value and the new torque level applied is measured and stored by the signal processing and computing means 20.

At this stage, two numbers representing the torques required to maintain rotor 12 at its null position at the two different rotor speeds are known. These two numbers contain sufficient information to determine heading angle $\phi$ as will be made clear below.

The disturbing torque $T_e$ acting on the gyroscope rotor 12 arising from the earth's angular velocity is well known to be $$T_e = \bar{\omega} \times \bar{H} \tag{1}$$

where $\bar{\omega}$ is the angular velocity vector of the earth and H is the angular momentum vector of gyro rotor 12. Expansion of the cross product in equation (1) yields the disturbing torque about the output axis 14

$$|T_e| = H\omega \cos \theta \sin \phi \tag{2}$$

where H and $\omega$ are the magnitudes of the rotor angular momentum and earth rate respectively. The disturbing torques other than that induced by earth rotation may be represented as $T_d$. $T_d$ includes all disturbing torques such as those arising from mass imbalances, thermally caused distortions, etc. Because disturbing torques due to unpredictable magnetization level changes inherent in hysteresis motors have been eliminated by the use of the permanent magnet motor 15, $T_d$ either remains constant with rotor speed change or varies in a predictable, repeatable way which can be determined in advance by calibration techniques.

Assuming by way of illustration that $T_d$ remains constant with rotor speed changes, the following two equations of torque equilibrium about the output axis 14 may be written:

$$T_1 \text{ applied} = H_1 \omega \cos \theta \sin \phi + T_d \tag{3}$$

$$T_2 \text{ applied} = H_2 \omega \cos \theta \sin \phi + T_d \tag{4}$$

where $T_1$ applied and $T_2$ applied are the torques applied by the torque motor 16 and measured by the signal processing and computing means 20 at the first and second rotor speeds; and $H_1$ and $H_2$ are the magnitudes of the rotor 12 angular momentum at the two rotor speeds. By simple algebraic manipulation, the heading angle $\phi$ may be expressed as $$\phi = \sin^{-1}\left[\frac{T_1 \text{ applied} - T_2 \text{ applied}}{(H_1 - H_2)\omega \cos \theta}\right] \tag{5}$$

This calculation is carried out in the signal processing and computing means 20, the output of which is the true heading angle $\phi$.

Figure 2:
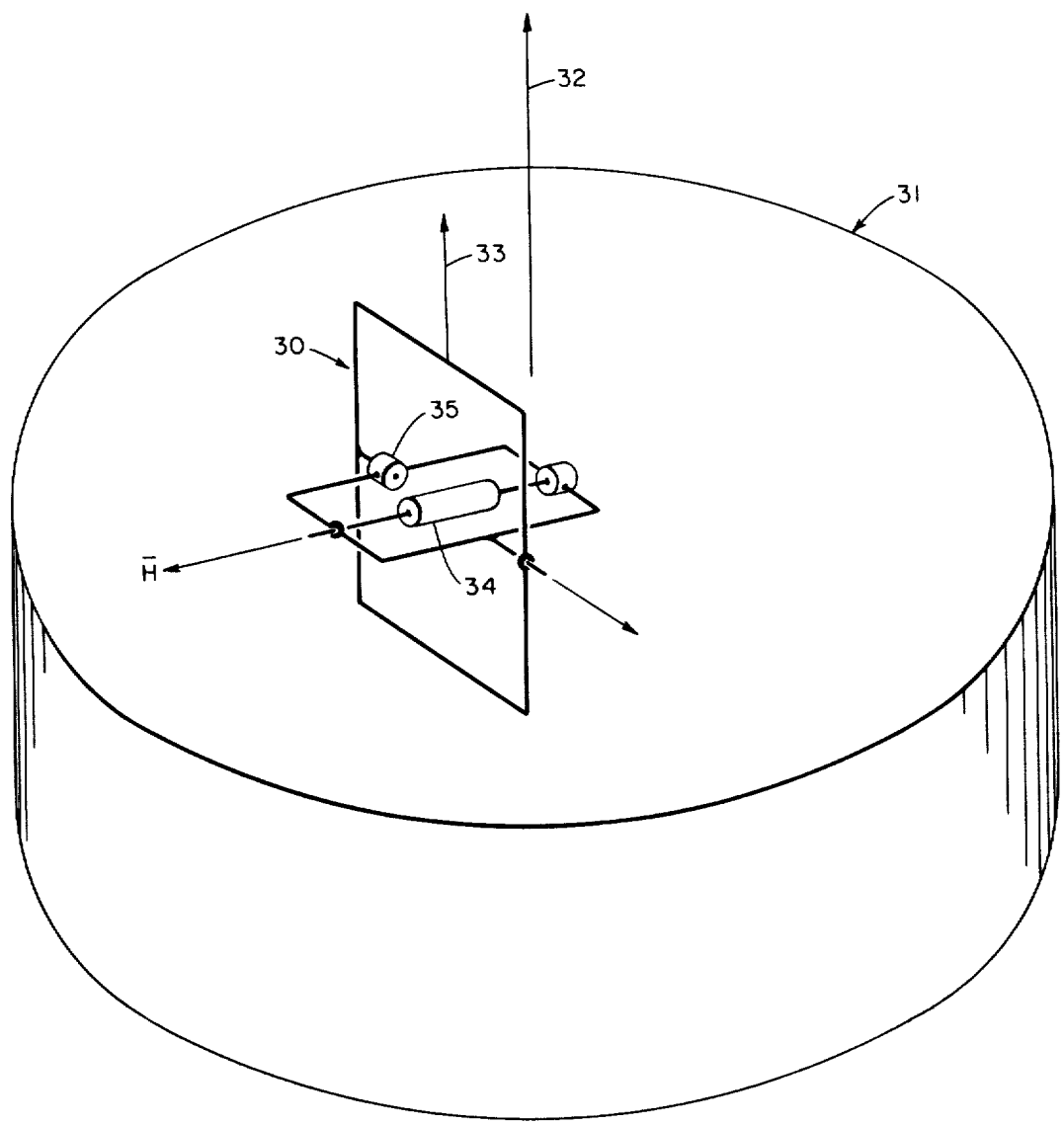
FIG. 2 is a diagrammatic representation of an embodiment of the invention for monitoring drift.

In FIG. 2, monitoring gyroscope 30 is shown diagrammatically attached to a stable platform 31. The platform 31 is controlled, as by additional gyroscopes (not shown), to maintain a fixed orientation with respect to an inertial coordinate system, i.e., stabilized with respect to earth or inertial space. A limiting factor for long term navigation using such a stable platform has been long term drift in the gyroscopes, especially the gyroscope which controls angular orientation about vertical axis 32. In this example of an earth stabilized platform, the monitoring gyro 30 is oriented so that its input axis 33 is vertical so that it will sense rotations about the vertical. In this orientation, therefore, monitoring gyro 30 will sense the known vertical component of earth rate plus any long term drift uncertainty of angular rate of the platform itself about vertical axis 32. As in the gyrocompassing mode of operation discussed above, the rotor 34 is spun at varying or two predetermined speeds while torque motor 35 maintains a null rotor orientation. Because the vertical component of earth rate is known, the angular velocity of platform 31 itself is thus readily monitored by gyro 30. Any measured platform rate as determined by monitor gyro 30 is thus an indication of the drift in the gyroscope which controls angular orientation about vertical axis 32. This monitor capability is applicable to any axis and any platform inertial reference mode.

It is thus seen that the invention herein described is capable of determining heading angle accurately using the rotor speed modulation technique to isolate and determine that torque arising from the earth's rotation. In addition, the invention allows the drift rate of other gyroscopes to be monitored accurately.

It is understood that modifications and variations of the invention described herein will occur to those skilled in the gyrocompassing art, and it is intended that such modifications and variations fall within the scope of the appended claims.

What is claimed is:

1. A gyrocompass for indicating the direction of true north comprising:

a gyroscope rotor;
a permanent magnet motor adapted to spin said rotor about a spin axis at varying angular rates;
gimbal means to support said rotor for angular rotation about said spin axis and to allow angular rotation of said rotor from a null position about an output axis perpendicular to said spin axis;
torquing means to maintain said rotor at said null position about said output axis;
measuring means to produce a first signal indicating the torque supplied by said torquing means at one of said rotor angular rates and to produce a second signal indicating the torque supplied by said torquing means at a different one of said rotor angular rates; and
signal processing means to operate upon said first and second signals to provide an indication of true north.

2. The gyrocompass of claim 1 wherein said torquing means comprises electromagnetic torque producing means and an automatic feedback control system responsive to the angular orientation of said rotor from said null position about said output axis to maintain said rotor at substantially said null position.

3. A gyrocompass for indicating the direction of true north comprising:
a gyroscope rotor;
a permanent magnet motor adapted to spin said rotor about a spin axis at two different predetermined angular rates;
gimbal means to support said rotor for angular rotation about said spin axis and to allow angular rotation of said rotor from a null position about an output axis perpendicular to said spin axis;
torquing means to maintain said rotor at said null position about said output axis;
measuring means to produce a first signal indicating the torque supplied by said torquing means at one of said predetermined rotor angular rates and to produce a second signal indicating the torque supplied by said torquing means at the other of said predetermined rotor angular rates; and
signal processing means to operate upon said first and second signals to provide an indication of true north.

4. The gyrocompass of claim 3 wherein said torquing means comprises electromagnetic torque producing means and an automatic feedback control system responsive to the angular orientation of said rotor from said null position about said output axis to maintain said rotor at substantially said null position.

5. In a gyrocompass comprising:
a gyroscope rotor;
a permanent magnet motor adapted to spin said rotor about a spin axis at two different predetermined angular rates;
gimbal means to support said rotor for angular rotation about said spin axis and to allow angular rotation of said rotor from a null position about an output axis perpendicular to said spin axis;
torquing means to maintain said rotor at said null position about said output axis;
measuring means to produce a signal indicating the torque supplied by said torquing means;
the method of determining true north comprising the steps of:
(1) orienting said spin axis of said rotor in the horizontal plane and orienting said output axis along the vertical;
(2) spinning said rotor at one of said predetermined angular rates and recording a first said signal from said measuring means indicating said torque at said one of said predetermined angular rates;
(3) spinning said rotor at the other of said predetermined angular rates and recording a second said signal from said measuring means indicating said torque at said other predetermined angular rate; and
(4) processing said first and second signals to provide an indication of true north.

6. Apparatus for monitoring the angular rate of an inertial platform comprising:
a gyroscope rotor;
a permanent magnet motor adapted to spin said rotor about a spin axis at two different predetermined angular rates;
gimbal means to support said rotor on said platform for angular rotation about said spin axis and to allow angular rotation of said rotor from a null position about an output axis perpendicular to said spin axis;
torquing means to maintain said rotor at said null position about said output axis;
measuring means to produce a first signal indicating the torque supplied by said torquing means at one of said predetermined rotor angular rates and to produce a second signal indicating the torque supplied by said torquing means at the other of said predetermined rotor angular rates; and
signal processing means to operate upon said first and second signals to indicate said angular rate.

* * * * *